(12) United States Patent
Wulff et al.

(10) Patent No.: US 11,574,241 B2
(45) Date of Patent: Feb. 7, 2023

(54) ADAPTIVE THRESHOLD SELECTION FOR SD-WAN TUNNEL FAILURE PREDICTION

(71) Applicant: Cisco Technology, inc., San Jose, CA (US)

(72) Inventors: Sharon Shoshana Wulff, Zurich (CH); Grégory Mermoud, Veyras VS (CH); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 791 days.

(21) Appl. No.: 16/392,825

(22) Filed: Apr. 24, 2019

(65) Prior Publication Data

US 2020/0342346 A1    Oct. 29, 2020

(51) Int. Cl.
*H04L 41/147* (2022.01)
*G06N 20/00* (2019.01)
*H04L 41/50* (2022.01)
*H04L 12/46* (2006.01)

(52) U.S. Cl.
CPC ......... *G06N 20/00* (2019.01); *H04L 12/4633* (2013.01); *H04L 41/50* (2013.01)

(58) Field of Classification Search
CPC ......... G06N 20/00; H04L 41/06; H04L 41/16; H04L 41/147; H04L 12/4633; H04L 41/50; H04L 41/5025; H04L 45/28; H04L 69/40; H04L 41/0654; H04L 41/0677; H04L 41/0659; H04L 45/22
See application file for complete search history.

(56) References Cited

U.S. PATENT DOCUMENTS

| | | | |
|---|---|---|---|
| 8,154,986 B2 * | 4/2012 | Xiong | H04L 43/0817 370/216 |
| 9,667,559 B2 | 5/2017 | Bhattacharya | |
| 9,787,573 B2 * | 10/2017 | Singh | H04L 45/24 |
| 11,106,994 B1 * | 8/2021 | Batalov | G06N 5/04 |
| 2009/0240729 A1 * | 9/2009 | Zwol | G06F 16/285 707/E17.046 |

(Continued)

OTHER PUBLICATIONS

Basu et al., Combining Multiple Sources of Data for Situational Awareness of Geomagnetic Disturbances, 2015, IEEE, https://ieeexplore.ieee.org/stamp/stamp.jsp?tp=&arnumber=7286179 (Year: 2015).*

(Continued)

*Primary Examiner* — Hitesh Patel
*Assistant Examiner* — Vinh Nguyen
(74) *Attorney, Agent, or Firm* — Behmke Innovation Group LLC; Kenneth J. Heywood; Jonathon P. Western

(57) ABSTRACT

In one embodiment, a supervisory service for a software-defined wide area network (SD-WAN) uses a plurality of different decision thresholds for a machine learning-based classifier, to predict tunnel failures of a tunnel in the SD-WAN. The supervisory service captures performance data indicative of performance of the classifier when using the different decision thresholds. The supervisory service selects, based on the captured performance data, a particular decision threshold for the classifier, in an attempt to optimize the performance of the classifier. The supervisory service uses the selected decision threshold for the classifier, to predict a tunnel failure of the tunnel.

20 Claims, 9 Drawing Sheets

(56) References Cited

U.S. PATENT DOCUMENTS

| | | | |
|---|---|---|---|
| 2009/0279444 A1* | 11/2009 | Ravindran | H04L 41/5038 |
| | | | 370/252 |
| 2011/0251989 A1* | 10/2011 | Kraaij | G06F 16/353 |
| | | | 706/50 |
| 2013/0329548 A1* | 12/2013 | Nakil | H04L 41/12 |
| | | | 370/228 |
| 2015/0333953 A1* | 11/2015 | Vasseur | H04L 47/127 |
| | | | 370/228 |
| 2017/0155590 A1 | 6/2017 | Dillon et al. | |
| 2017/0195161 A1* | 7/2017 | Ruel | H04L 63/061 |
| 2017/0262633 A1* | 9/2017 | Miserendino | G06F 21/566 |
| 2018/0247239 A1* | 8/2018 | Horrell | G06F 11/008 |
| 2018/0374058 A1* | 12/2018 | Perrone | G06Q 30/0219 |
| 2019/0036776 A1 | 1/2019 | Smith | |
| 2019/0036808 A1 | 1/2019 | Shenoy et al. | |
| 2019/0036828 A1 | 1/2019 | Bajaj | |
| 2019/0044824 A1* | 2/2019 | Yadav | H04W 24/08 |
| 2019/0052558 A1* | 2/2019 | Mehta | H04L 41/142 |
| 2019/0266513 A1* | 8/2019 | Eban | G06N 20/00 |
| 2020/0204452 A1* | 6/2020 | Bhat | H04L 41/0677 |

OTHER PUBLICATIONS

Kuhn, et al., "Optimizing Probability Thresholds for Class Imbalances", Applied Predictive Modeling, Springer; 1st ed. 2013, Corr. 2nd printing 2018 edition (Mar. 30, 2018), online: http://appliedpredictivemodeling.com/blog/2014/2/1/lw6har9oewknvus176q4041alqw2ow, printed Sep. 2019, 9 pages, Springer.

Pozzolo, et al., "Calibrating Probability with Undersampling for Unbalanced Classification", 2015 IEEE Symposium Series on Computational Intelligence, Dec. 2015, pp. 159-166, Cape Town, South Africa, IEEE.

* cited by examiner

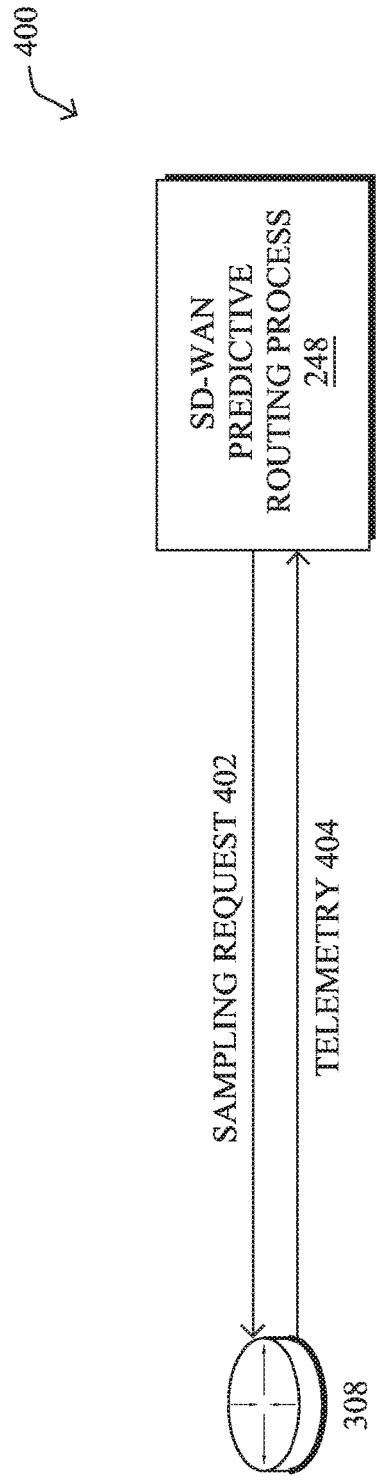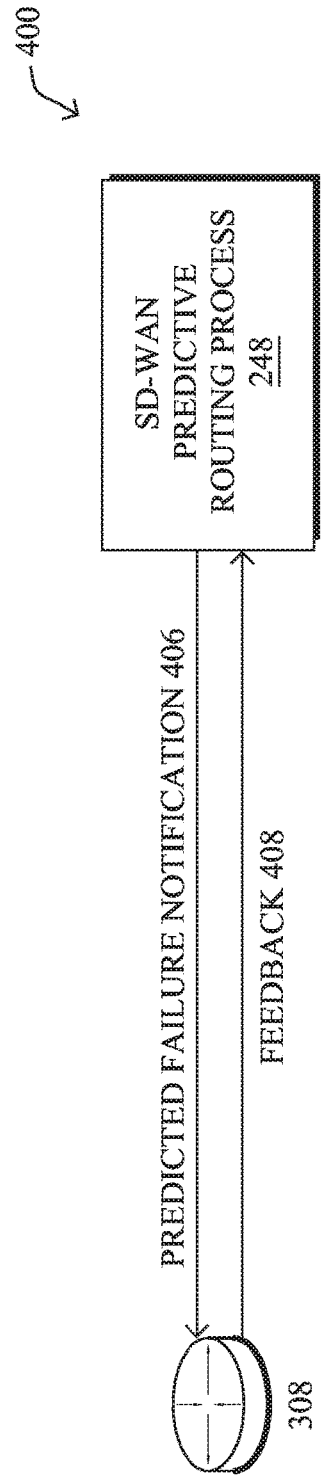
FIG. 4A
FIG. 4B

ADAPTIVE THRESHOLD SELECTION FOR SD-WAN TUNNEL FAILURE PREDICTION

TECHNICAL FIELD

The present disclosure relates generally to computer networks, and, more particularly, to adaptive threshold selection for software-defined wide area networks (SD-WANs) tunnel failure prediction.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs.

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits. While this approach is somewhat effective at mitigating tunnel failures in an SD-WAN, reactive failure detection is also predicated on a failure first occurring. This means that traffic will be affected by the failure, until the traffic is moved to another tunnel.

With the recent evolution of machine learning, predictive failure detection in an SD-WAN now becomes possible through the use of classification techniques. Training, though, remains challenging due to a significant imbalance between positive examples (e.g., tunnel failures) and negative examples (e.g., normal tunnel behavior). This imbalance naturally leads to limits on the maximal performance achievable by the classifier. One way to address this is to set a threshold whereby only classifier predictions that exceed a certain probability are treated as future failures for purposes of predictive routing. However, setting this threshold too low or too high can result in the system either missing tunnel failures or unnecessarily rerouting tunnels that would not actually fail.

BRIEF DESCRIPTION OF THE DRAWINGS

FIGS. 4A-4C illustrate examples of feedback for tunnel failure predictions;

DESCRIPTION OF EXAMPLE EMBODIMENTS

Overview

Figure 1A:
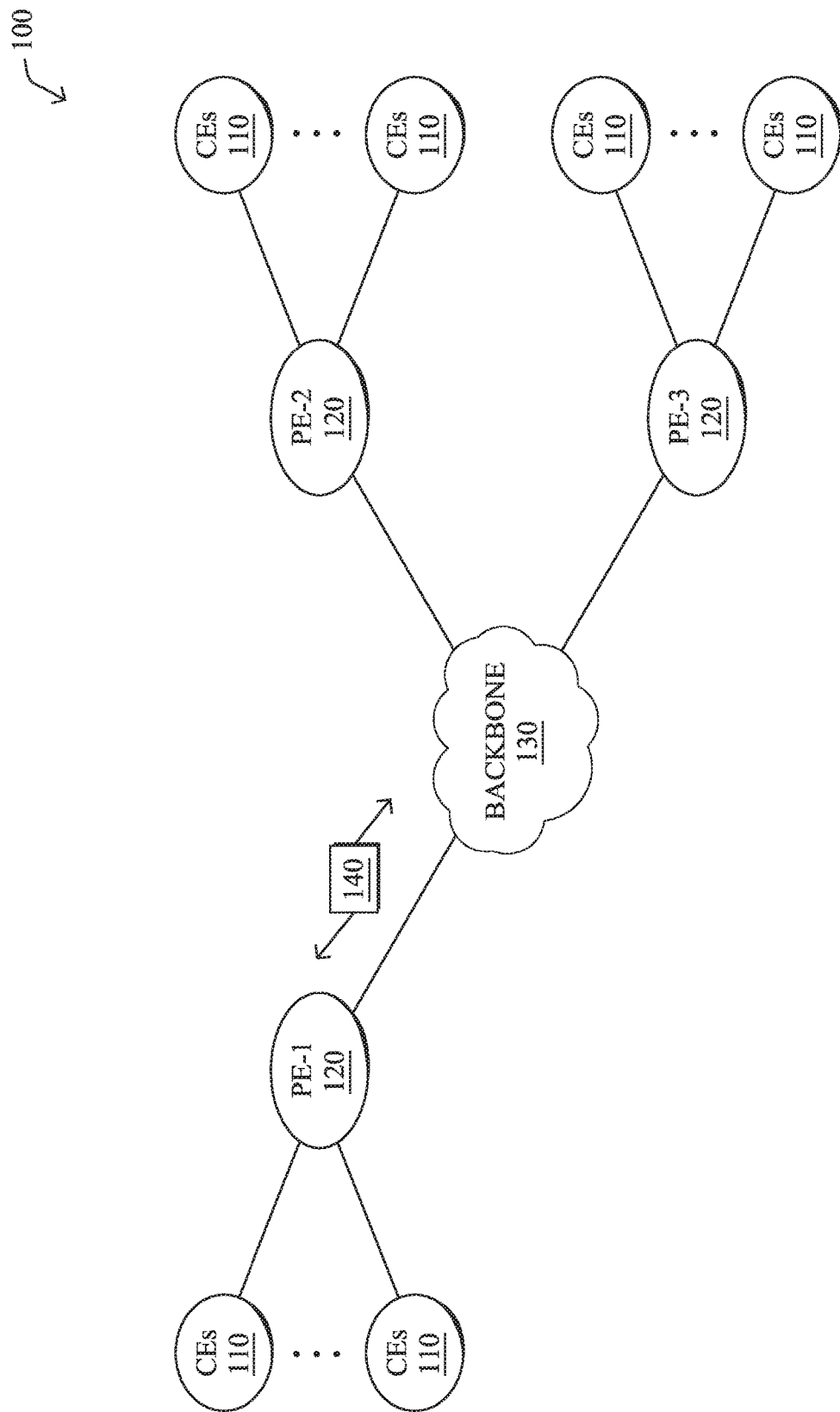
FIGS. 1A-1B illustrate an example communication network.

According to one or more embodiments of the disclosure, a supervisory service for a software-defined wide area network (SD-WAN) uses a plurality of different decision thresholds for a machine learning-based classifier, to predict tunnel failures of a tunnel in the SD-WAN. The supervisory service captures performance data indicative of performance of the classifier when using the different decision thresholds. The supervisory service selects, based on the captured performance data, a particular decision threshold for the classifier, in an attempt to optimize the performance of the classifier. The supervisory service uses the selected decision threshold for the classifier, to predict a tunnel failure of the tunnel.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two primary links for the CE router (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
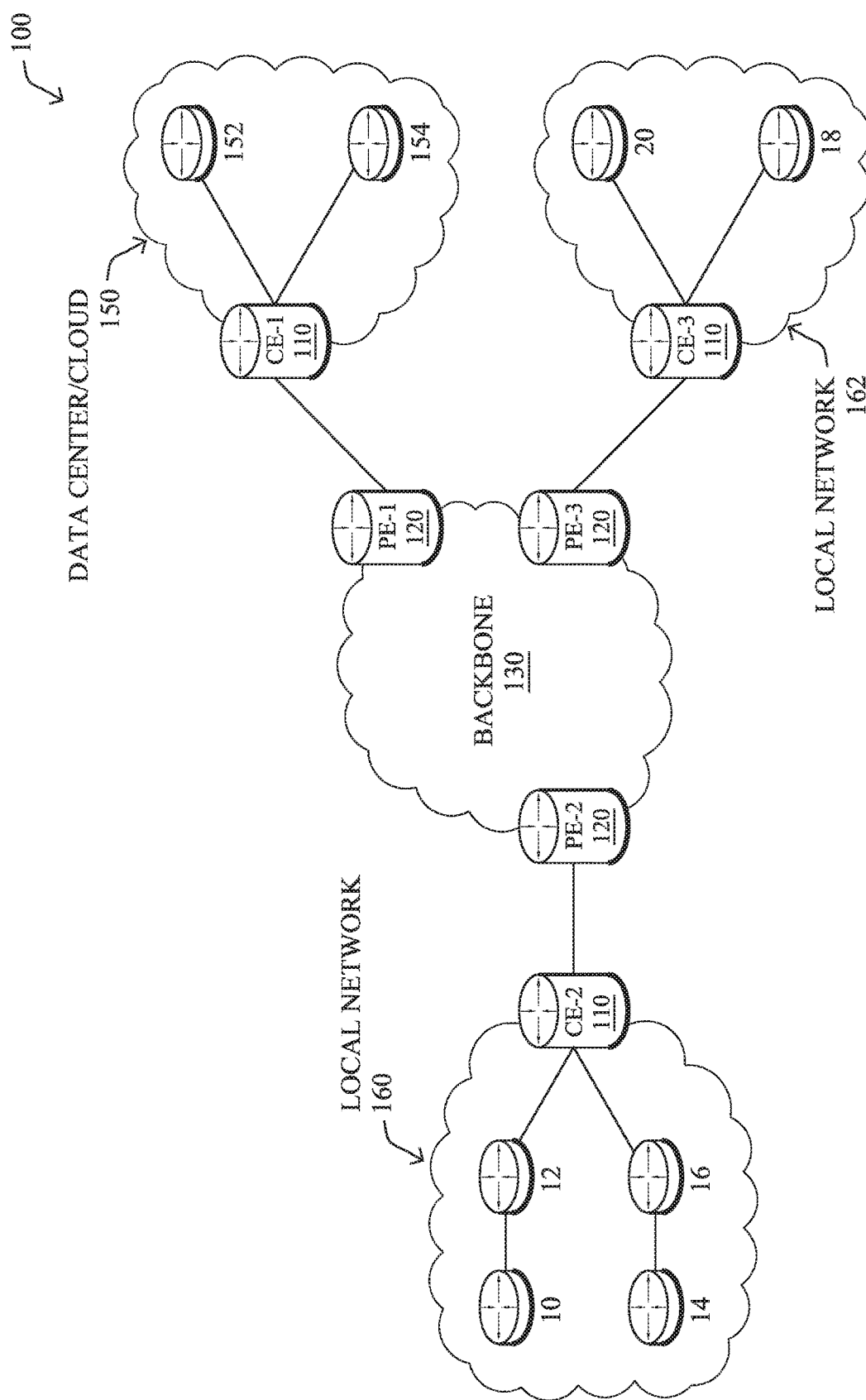

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud 150 on top of the various underlying connections. Another feature of SD-WAN is centralized management by a supervisory service that can monitor and adjust the various connections, as needed.

Figure 2:
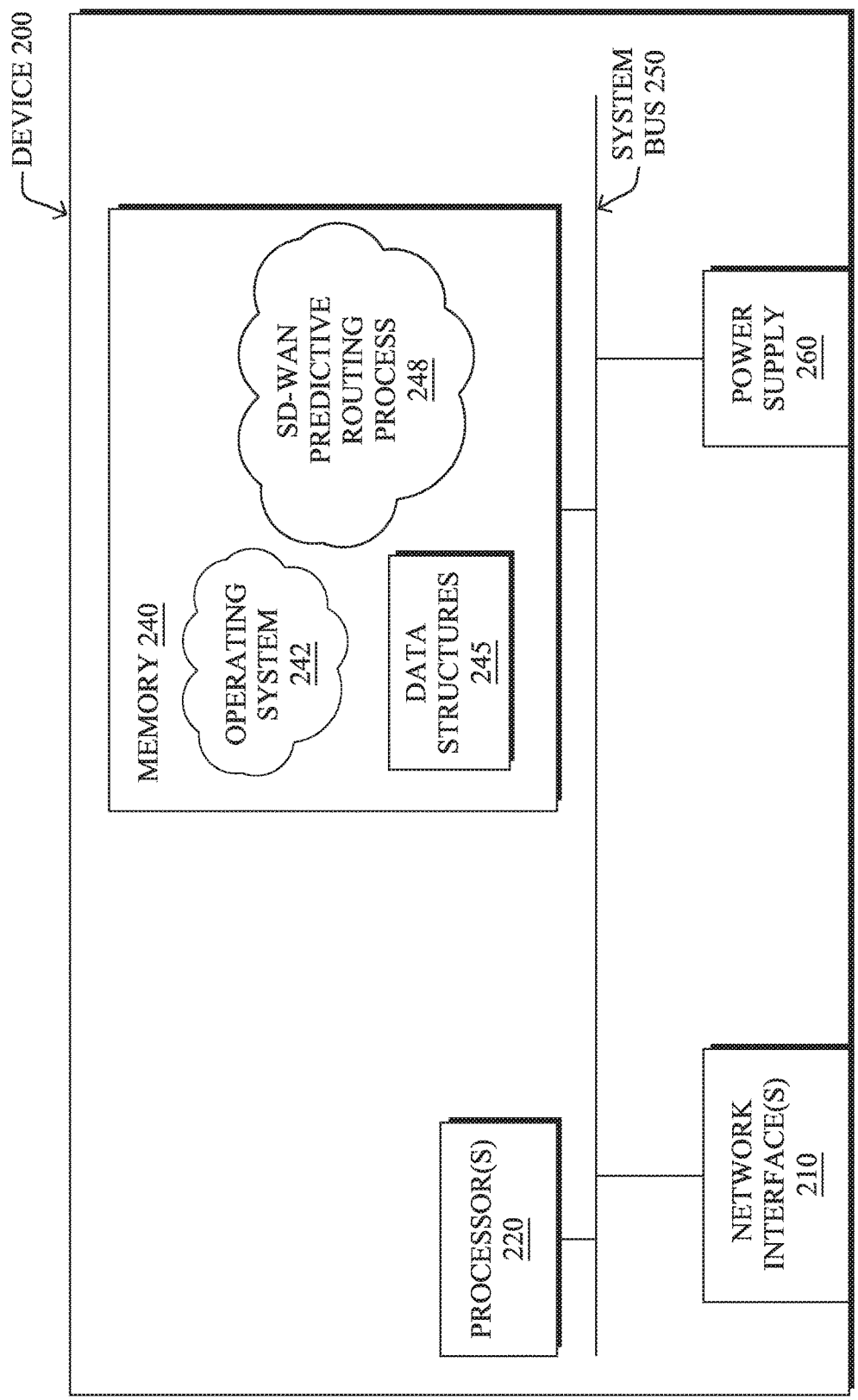
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an SD-WAN predictive routing process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

SD-WAN predictive routing process 248, detailed further below, includes computer executable instructions that, when executed by processor(s) 220, cause device 200 to predict SD-WAN tunnel failures and proactively reroute traffic to different tunnels, prior to their current tunnels failing. To do so, in some embodiments, SD-WAN predictive routing process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, SD-WAN predictive routing process 248 may employ one or more supervised, unsupervised, or semi-supervised machine learning models. Generally, supervised learning entails the use of a training set of data, as noted above, that is used to train the model to apply labels to the input data. For example, the training data may include sample network telemetry that has been labeled as indicative of an SD-WAN tunnel failure or indicative of normal tunnel operation. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior. Semi-supervised learning models take a middle ground approach that uses a greatly reduced set of labeled training data.

Example machine learning techniques that SD-WAN predictive routing process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that an SD-WAN tunnel will fail. Conversely, the false negatives of the model may refer to the number of times the model predicted normal tunnel operations, when the tunnel actually fails. True negatives and positives may refer to the number of times the model correctly predicted whether a tunnel will perform normally or will fail, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, failure detection in a network has traditionally been reactive, meaning that the failure must first be detected before rerouting the traffic along a secondary (backup) path. This is true, not only for IP and MPLS networks, but also for optical networks (with protection and restoration) such as SONET and SDH networks. Typically, failure detection leverages either explicit signaling from the lower network layers (e.g., optical failures signaled to the upper layers) or using a keep-alive mechanism that sends probes at some interval T that must be acknowledged by a receiver (e.g., a tunnel tail-end router). For example, routing protocols such as Open Shortest Path First (OSPF) and Intermediate System to Intermediate System (IS-IS) use keep-alive signals over routing adjacencies or MPLS traffic engineering (TE) tunnels. Protocols such as Bidirectional Forwarding Detection (BFD) also make use of keep-alive mechanisms.

Traditionally, failure detection in an SD-WAN has relied on the keep-alive mechanisms of BFD over tunnels, such as IPSec tunnels. When the BFD signaling times out, the tunnel is flagged as failed and traffic is rerouted onto another tunnel. While this approach does help to mitigate the effects of the failure, the reactive nature of this approach also means that at least some of the traffic will be lost.

Figure 3:
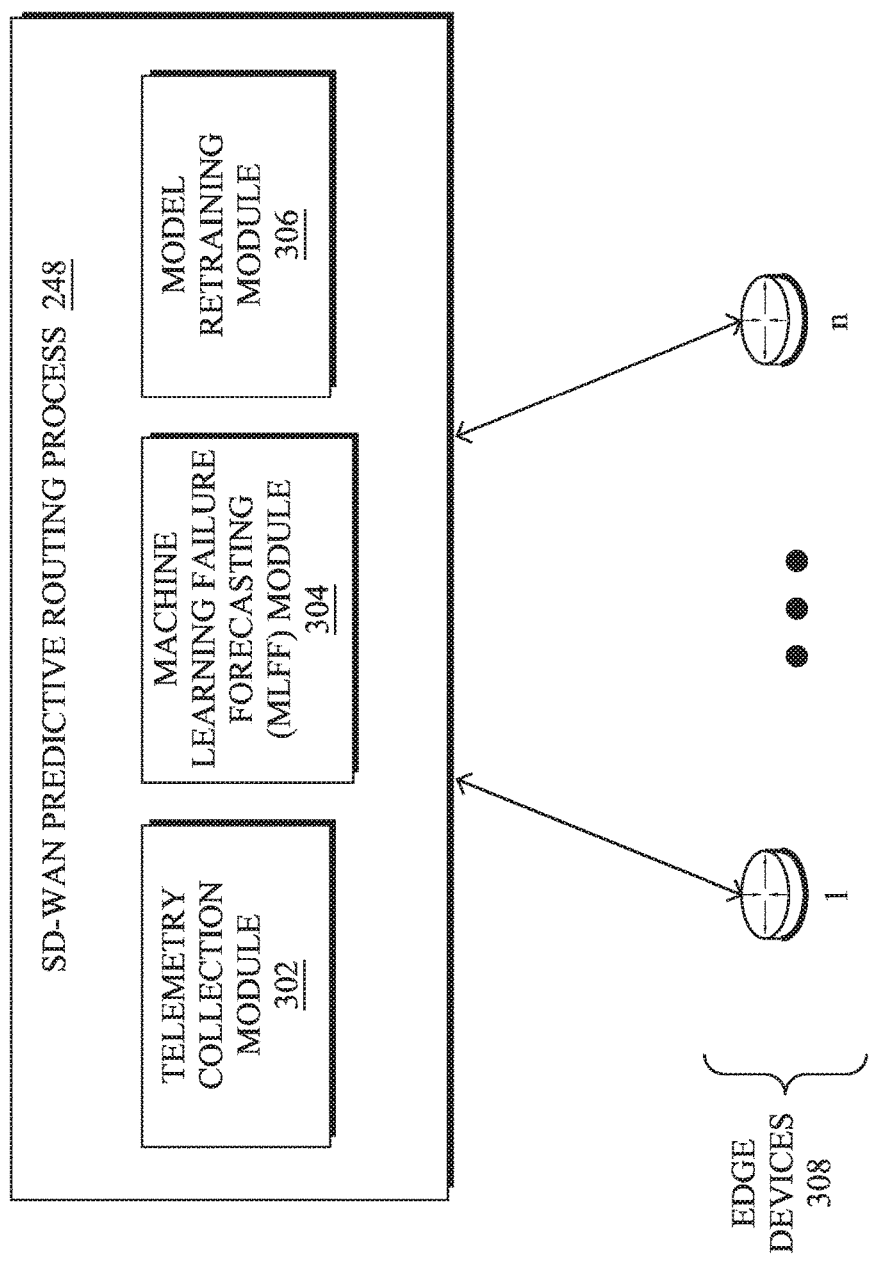
FIG. 3 illustrates an example architecture for predicting tunnel failures in a software-defined wide area network (SD-WAN)

FIG. 3 illustrates an example architecture 300 for predicting tunnel failures in an SD-WAN, according to various embodiments. In general, architecture 300 may be implemented by a device (e.g., device 200 described previously) executing specialized instructions, such as SD-WAN predictive routing process 248, to provide a supervisory service to one or more SD-WAN instances. For example, an SD-WAN controller or other monitoring service may implement architecture 300 either locally in the network or as a cloud-based service. As shown, SD-WAN predictive routing process 248 may include the following components: a telemetry collection module 302, a machine learning failure forecasting (MLFF) module 304, and/or a model retraining module 306. These components 302-306 may be implemented in a distributed manner or implemented as their own stand-alone services, either as part of the network under observation or as a remote service. In addition, the functionalities of the components of architecture 300 may be combined, omitted, or implemented as part of other processes, as desired.

SD-WAN predictive routing process 248 may be in communication with any number of edge devices 308 (e.g., a first through $n^{th}$ device), such as CE routers 110, described previously. In various embodiments, edge devices 308 may be part of the same SD-WAN or, in cases in which process 248 is implemented as a cloud-based service, part of any number of different SD-WANs.

In general, there are many circumstances in a network that can lead to tunnel failures in various areas of the network between a head-end and tail-end router (e.g., between routers 110, etc.). An objective of MLFF 304, as detailed below, is to learn early signs (networking behavioral) that have some predictive power, allowing the model to predict/forecast a tunnel failure. It is expected that some failures are predictable (i.e., there exist early signs of an upcoming failure) while others will not be non-predictable (e.g., fiber cut, router crash, etc.). More specifically, almost all failures exhibit early signs, but those signs may appear only a few milliseconds (or even nanoseconds), prior to the failure (e.g. fiber cut), thereby making forecasting an almost impossible task. Some non-predictable failures may be due to the absence of signaling back to the edge device 308 involved and may be localized to the core of the service provider network (e.g., the underlying IP, 4G, 5G, etc. network), in which case the failure is non-predicable from the perspective of the edge device 308.

A first aspect of architecture 300 relates to telemetry collection module 302 obtaining the telemetry data required for model training by MLFF module 304. As used herein, the term 'relevant telemetry' refers to a telemetry measurement variable with predictive power to predict tunnel failures, which can be determined dynamically by MLFF module 304. Indeed, failures may be predictable, yet not successfully predicted, due to a lack of relevant telemetry, the inability of the model to predict the failure, or the telemetry is sampled at too coarse of a time granularity. In some embodiments, to obtain relevant telemetry from edge devices 308, process 248 may send a custom request to one or more of devices 308 with the objective of obtaining the list of events of interest along with the set of candidate telemetry variables with potential predictive power to predict tunnel failures. In further embodiments, edge devices 308 may instead provide the telemetry data to process 248 on a push basis (e.g., without process 248 first requesting the telemetry data).

In various embodiments, telemetry collection module 302 may adjust the set of telemetry variables/parameters obtained from the edge device(s) 308 and/or their sampling frequency. If, for example, MLFF module 304 determines that a particular telemetry variable has a strong predictive power (according to the feature importance, Shapley values, etc.), the frequency at which such a variable may be gathered may be higher compared to a variable with lower predictive power. MLFF module 304 may also determine the predictive power of a particular telemetry variable by assessing the conditional probabilities involved, in further embodiments.

MLFF module 304 may also select the set of most relevant telemetry variables. In turn, telemetry collection module 302 may request that edge devices 308 measure and send these variables to process 248 periodically, since real-time variations of such telemetry is needed for forecasting tunnel down events. For example, based on the above conclusion, MLFF module 304 may determine that the CPU and memory utilizations of one or more networking devices that support a given tunnel should be sent periodically (e.g., every 1 second) by edge devices 308.

Other telemetry variables, such as during a rekey failure when the edge router is not able to successfully exchange the security keys with the controller, may also be requested to be sent to process 248, on occurrence of the event. Since such events are rare and the states of the variables remain the same for longer periods of time, telemetry collection module 302 may request an event-based push request, rather than periodic messages. In other words, telemetry collection module 302 may instruct one or more of edge devices 308 to report certain telemetry variables only after occurrence of certain events. For example, Table 1 below shows some example telemetry variables and when an edge device 308 may report them to process 248:

TABLE 1

| Relevant Telemetry | Request Type |
| --- | --- |
| Memory_utilization | Requested from head and tail |
| CPU Utilization | edge routers. |
| BFD Probe Latency, Loss and Jitter | Periodically once every 1 second. |
| Queue statistics (% - age drops for different queues) | |
| Interface down event | Requested from both head and tail |
| Rekey exchange failure | edge routers |
| Router crash logs | Upon event occurrence. |

In a further embodiment, MLFF module 304 may also attempt to optimize the load imposed on the edge device(s) 308 reporting the telemetry variables to process 248. For example, MLFF module 304 may determine that the CPU and memory usages should be measured and reported every minute to process 248.

A key functionality of MLFF module 304 is to train any number of machine learning-based models to predict tunnel failures in the SD-WAN(s). Preferably, the models are time-series models trained centrally (e.g., in the cloud) using the telemetry collected by telemetry collection module 302. In one instantiation of MLFF module 304, the models may be trained on a per customer or per-SD-WAN basis. Testing has shown that model performance may be influenced by parameters specific to a given network instantiation, thus promoting an implementation whereby MLFF module 304 trains a model for a specific network deployment. In further embodiments, MLFF module 304 may even train certain models on a per-tunnel basis. Although such an approach may be of limited scalability, it may be highly valuable for tunnels carrying a very large amount of potentially very sensitive traffic (e.g., inter-cloud/data center traffic).

As pointed out earlier, with current reactive routing approaches, recall (i.e., the proportion of failures being successfully predicted) is simply equal to 0, since rerouting is always reactive. In other words, the system reacts a posteriori. As a result, any recall >0 is a significant gain. One performance metric that MLFF module 304 may consider is the maximum recall (Max_Recall) achieved by the model given a precision >P_Min. For example, MLFF module 304 may evaluate the variability of Max_Recall across datasets, should a single model be trained across all datasets, to determine whether an SD-WAN specific or even a tunnel specific model should be trained.

In various embodiments, MLFF module 304 may dynamically switch between per-tunnel, per-customer/SD-WAN, and global (multiple SD-WAN) approaches to model training. For example, MLFF module 304 may start with the least granular approach (e.g., a global model across all customers/SD-WANs) and then evaluate the performance of the global model versus that of per-customer/SD-WAN models. Such model performance comparison could be easily evaluated by comparing their related precision-recall curves (PRCs)/area under the curve (AUCs), or the relative Max_Recall, given that Precision >P_min.

In some cases, MLFF module 304 may employ a policy to trigger per-customer/SD-WAN specific model training, if the Max_Recall value improvement is greater than a given threshold. In another embodiment, a similar policy approach may be used to specifically require a dedicated model for a given tunnel according to its characteristic (between router A and router B), the type of traffic being carried out (e.g., sensitive traffic of type T, etc.), or the performance of the global or SD-WAN specific model for that tunnel. In such a case, the edge devices 308 may be in charge of observing the routed traffic and, on detecting a traffic type matching the policy, request specific model training by MLFF module 304, to start per-tunnel model training for that tunnel.

Prototyping of the techniques herein using simple models and input features based on coarse telemetry, such as 1-minute averages of loss, latency, jitter, traffic, as well as CPU/memory of CE routers, lead to recalls in the range of a few percent with a precision of 80% or more. More advanced time-series models, such as long short-term memories (LSTMs), especially with attention mechanisms, will achieve even better performance. More importantly, using richer and more fine-grained telemetry is an important driver of the forecasting performance.

Once MLFF module 304 has trained a prediction model, different options exist for its inference location (e.g., where the model is executed to predict tunnel failures). In a first embodiment, model inference is performed centrally (in the cloud), thus co-located with the model training. In such a case, once MLFF module 304 identifies the set of telemetry variables with predictive power (used for prediction), telemetry collection module 302 may send a custom message to the corresponding edge device(s) 308 listing the set of variables along with their sampling/reporting frequencies. Note that sampling is a dynamic parameter used by MLFF module 304 computed so as to optimize the PRC of the model against the additional overhead of the edge device 308 pushing additional data to the cloud (and also generating additional logging of data on the router).

In another embodiment, MLFF module 304 may push the inference task, and the corresponding prediction model, to a specific edge device 308, so that the prediction is preformed on-premise. Such an approach may be triggered by the frequency of sampling required to achieve the required model performance. For example, some failure types are known to provide signal a few seconds, or even milliseconds, before the failure. In such cases, performing the inference in the cloud is not a viable option, making on-premise execution of the model the better approach. Inference/model execution is usually not an expensive task on premise, especially when compared to model training. That being said, it may require fast processing on local event with an impact on the local CPU. In yet another embodiment, some models may be executed on premise, if the local resources on the router/edge device 308 are sufficient to feed the local model.

Thus, in some cases, the techniques herein support centralized model training (e.g., in the cloud), combined with the ability to perform local (on-premise) inference based on the required sampling frequency, local resources available on the edge device 308, as well as the bandwidth required to send the telemetry for input to a model in the cloud. For example, one failure prediction model may require a slow sampling rate but a large amount of data, due to a high number of input features with predictive power. Thus, reporting these telemetry variables to the cloud for prediction may consume too much WAN bandwidth on the network. In such a case, MLFF module 304 may take this constraint into account by evaluating the volume of required telemetry, according to the sampling frequency, and the WAN bandwidth allocated on the network for the telemetry traffic. To that end, MLFF module 304 may analyze the topology of the network and the available bandwidth for telemetry reporting (e.g., according to the QoS policy). If the bandwidth available for the telemetry used for the inference of the model exceeds the capacity, MLFF module 304 may decide to activate a local inference by pushing a prediction model to one or more of edge devices 308.

In yet another embodiment, MLFF module 304 may take a mixed approach whereby some of edge devices 308 perform the inferences locally, while others rely on SD-WAN predictive routing process 248 to perform the predictions.

A further embodiment of the techniques herein introduces a feedback mechanism whereby feedback regarding the predictions by a trained model is provided to model retraining module 306. In cases in which the model is executed on an edge device 308, the edge device 308 may report the rate of false positives and/or false negatives to model retraining module 308. Optionally, the reporting can also include additional context information about each false positive and/or false negative, such as the values of the telemetry variables that led to the incorrect prediction. If the performance of the model is below a designated threshold, model retraining module 306 may trigger MLFF module 304 to retrain the model, potentially increasing the granularity of the model, as well (e.g., by training a tunnel-specific model, etc.). In cases in which MLFF module 304 trains multiple prediction models, model retraining module 306 may evaluate the performance of each model and, based on their performances, decide that a particular one of the models should be used. Such an approach allows MLFF module 304 to dynamically switch between models, based on the data pattern currently being observed.

When failures are predicted in the cloud by SD-WAN predictive routing process 248, model retraining module 306 may similarly receive feedback from edge devices 308 regarding the predictions. For example, once a model M predicts the failure of a tunnel at a given time, MLFF module 304 may send a notification to the affected edge device 308 indicating the (list of) tunnel(s) for which a failure is predicted, along with the predicted time for the failure, and other parameters such as the failure probability $P_f$ (which can be a simple flag, a categorical variable (low, medium, high) or a real number). The edge device 308 may use $P_f$ to determine the appropriate action, such as pro-actively rerouting the traffic that would be affected by the failure onto a backup tunnel. In one embodiment, the predicted failure may be signaled to the edge device 308 using a unicast message for one or more tunnels, or a multicast messages signaling a list of predicted failure to a set of edge devices 308.

Regardless of how model retraining module 306 receives its feedback, either from the edge device 308 executing the prediction model or from MLFF module 304 executing the model, model retraining module 306 may dynamically trigger MLFF module 304 to retrain a given model. In one embodiment, the model re-training may be systematic. In another embodiment, upon reaching a plateau in terms of improvement for Max_Recall or Max_Precision, model retraining module 306 may reduce the frequency of the model training.

Figure 4C:
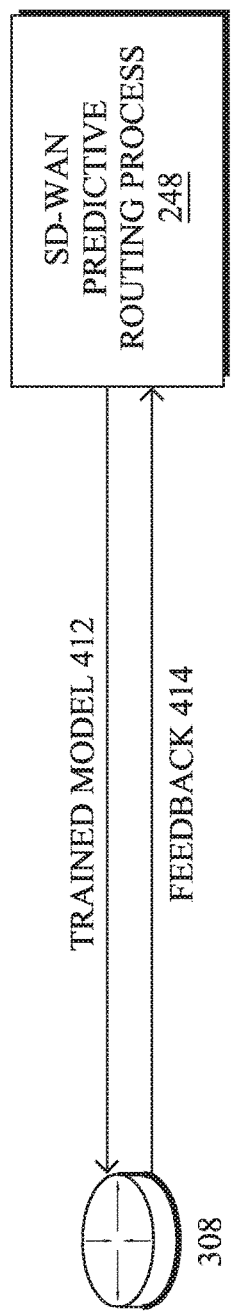

FIGS. 4A-4C illustrate examples of feedback for tunnel failure predictions, in various embodiments. As shown in example implementation 400 in FIGS. 4A-4B, assume that the trained model is executed in the cloud by SD-WAN predictive routing process 248. In such a case, process 248 may send a sampling request 402 to an edge device 308 that indicates the telemetry variables to sample and report, as well as the determined sampling/reporting period(s) for those variables. In turn, edge device 308 may report the requested telemetry 404 to process 248 for analysis. For example, process 248 may request that edge device 308 report is CPU load every minute to process 248, to predict whether the tunnel associated with edge device 308 is predicted to fail. More specifically, process 248 may use telemetry 404 as input to its trained prediction model, to determine whether telemetry 404 is indicative of a tunnel failure that will occur in the future.

When SD-WAN predictive routing process 248 determines that a tunnel failure is predicted, it may send a predicted failure notification 406 to edge device 308 that identifies the tunnel predicted to fail, the time at which the failure is expected to occur, and potentially the probability of failure, as well. Depending on the timing and probability of failure, edge device 308 may opt to reroute the affected traffic, or a portion thereof, to a different tunnel. In turn, edge device 308 may monitor the tunnel predicted to fail and provide feedback 408 to process 248 indicating whether the tunnel actually failed and, if so, when. Process 248 can then use feedback 408 to determine whether model retraining should be initiated, such as by training a more granular model for the SD-WAN instance or the specific tunnel under scrutiny.

FIG. 4C illustrates an alternate implementation 410 in which SD-WAN predictive routing process 248 pushes the failure prediction model to edge device 308 for local/on-premise inference. For example, process 248 may opt for edge device 308 to perform the local inferences, such as when model 412 requires too much bandwidth to send the needed telemetry to process 248 for cloud-based prediction. In turn, edge device 308 may use the corresponding telemetry measurements as input to trained model 412 and, if a failure is predicted, perform a corrective measure such as proactively rerouting the traffic to one or more other tunnels. In addition, edge device 308 may provide feedback 414 to process 248 that indicates false positives and/or false negatives by the model. For example, if edge device 308 reroutes traffic away from a tunnel predicted by model 412 to fail, and the tunnel does not actually fail, edge device 308 may inform process 248. Process 248 may use feedback 414 to determine whether model 412 requires retraining, such as by adjusting which telemetry variables are used as input to the model, adjusting the granularity of the training (e.g., by using only training telemetry data from the tunnel, etc.), or the like.

As noted above, a fundamental component of moving towards predictive routing in SD-WANs is the use of machine learning to predict tunnel failures before they actually occur. However, from a model training standpoint, there is a significant imbalance between positive examples of tunnel failures and negative examples of normal tunnel operation. This imbalance is a result of the failures being very rare (so-called extreme events), and it makes this task very challenging from a machine learning perspective.

Figure 5:
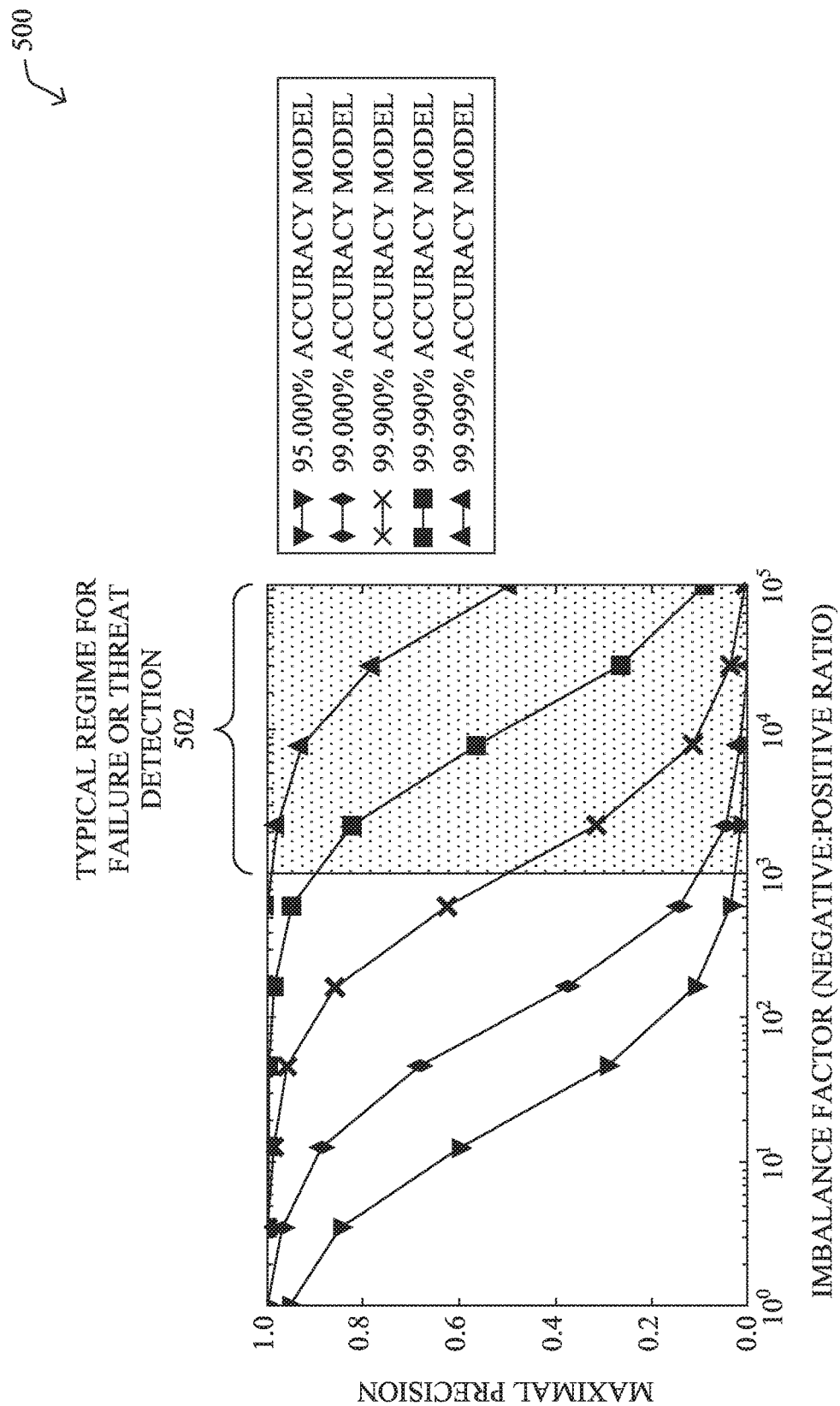
FIG. 5 illustrates an example plot of maximal precision vs. imbalance factor.

The key problem with imbalance in the training data is that even a small classification error can lead to very poor precision-recall curves (PRCs). Indeed, given an imbalance of 1:1000, a classification error of 1% (model with 99% accuracy) will lead to 10 false positives for every true positive, thus leading to only 10% precision. For example, FIG. 5 illustrates a plot 500 showing the maximal precision and accuracies possible for different imbalance factors. Typically, failure or threat detection is trained under a regime within region 502 shown.

Experimentation has shown that SD-WAN tunnel failures occur roughly every 3.5 days, on average, thus leading to an imbalance of 1:5000 for datasets sampled at one minute. As a result, to achieve 95% precision, the classifier needs to be trained such that it has an accuracy of at least 99.999%. For example, given 200 positives and 1,000,000 negatives (a 1:5000 ratio), an error rate of 0.001% will lead to 10 false positives and 200 true positives. Even with such an incredible accuracy, the system will still generate about 7,200 false alarms per day for a deployment of 500,000 tunnels, out of 720 million total samples.

In many supervised classification tasks, such as predicting tunnel failures using a trained classifier (e.g., the model of MLLF module 304), the classifier may generate a probability distribution over the space of labels, rather than a single label or class. For example, in a binary classification task, the prediction might be of the form [0.25, 0.75], meaning that the classifier asserts that there is a 75% chance that the test sample belongs to the second class/label (e.g., label '1') and only a 25% that the sample belongs to the first class (e.g., label '0'). In various embodiments, this probabilistic output can be transformed into a hard class assignment by applying a decision threshold to the probabilities. For example, if the classifier has a decision threshold of 60% and the prediction is of the form [0.25, 0.75], the classifier may assign the sample to class/label as the probability of the sample belonging to this class exceeds the threshold (i.e., 75%>60%). Conversely, if the decision threshold is set to 88%, the sample may be assigned to class/label 0.

In cases where the true class distribution is very skewed (imbalanced), tuning the decision threshold for the classifier becomes a very important tool in achieving the desired accuracy or precision with respect to the under-represented class. For a given SD-WAN deployment, the SD-WAN may comprise many tunnels, typically more than 10,000, each with different underlying data distributions and class imbalance factors. As noted above, a single classifier may be trained using a training dataset comprising telemetry data for any number of the tunnels, for computational and data sizing reasons.

In current SD-WAN deployments, it is common to have multiple types of transports available between cities. For example, sites may be interconnected thanks to MPLS, (public/business) Internet, 4G/5G, or even satellite links. (IPSec) tunnels are then automatically established to interconnect all sites using a hub and spoke, full or partial mesh, or other mixed topology. Each tunnel is then routed using one of the transports above. Once the tunnels are configured, application SLAs may be defined, to control which tunnels) are used to communicate certain application traffic. Typically, these SLAs are defined in terms of delay, loss, jitter, and the like. For example, a QoS SLA for voice traffic may require, at most, 150 ms one-way latency, 30 ms of jitter, and no more than 1% of packet loss. Each 'colored' tunnel (e.g., MPLS, Public Internet, etc.) has a recorded QoS performance (e.g., in terms of delay, loss, jitter) and if they match the Voice SLA requirements, then they are eligible to carry the voice traffic.

Adaptive Threshold Selection for SD-WAN Tunnel Failure Prediction

The techniques herein introduce an adaptive decision threshold selection mechanism for prediction SD-WAN tunnel failures. In some aspects, the techniques herein allow the decision threshold of a machine learning-based classifier trained to predict tunnel failures to be adjusted dynamically over time and on a per-tunnel basis. The advantages of adapting the decision threshold of the classifier on a per-tunnel basis are two-fold: in addition to overcoming the class imbalance problem, doing so also allows for a tunnel-specific failure predictability guarantee, within some error margin. In further aspects, the ability of the classifier to predict tunnel failures for a particular tunnel can be quantified as a maximum forecastable failure prediction metric (MFFP), which can be used as an SLA characteristic of the tunnel, for purposes of tunnel selection. By doing so, only tunnels in which the tunnel failure predictions meet a certain level of performance may be selected for purposes of communicating certain application traffic.

Specifically, according to one or more embodiments herein, a supervisory service for a software-defined wide area network (SD-WAN) uses a plurality of different decision thresholds for a machine learning-based classifier, to predict tunnel failures of a tunnel in the SD-WAN. The supervisory service captures performance data indicative of performance of the classifier when using the different decision thresholds. The supervisory service selects, based on the captured performance data, a particular decision threshold for the classifier, in an attempt to optimize the performance of the classifier. The supervisory service uses the selected decision threshold for the classifier, to predict a tunnel failure of the tunnel.

Illustratively, the techniques described herein may be performed by hardware, software, and/or firmware, such as in accordance with the SD-WAN predictive routing process 248, which may include computer executable instructions executed by the processor 220 (or independent processor of interfaces 210) to perform functions relating to the techniques described herein.

Figure 6:
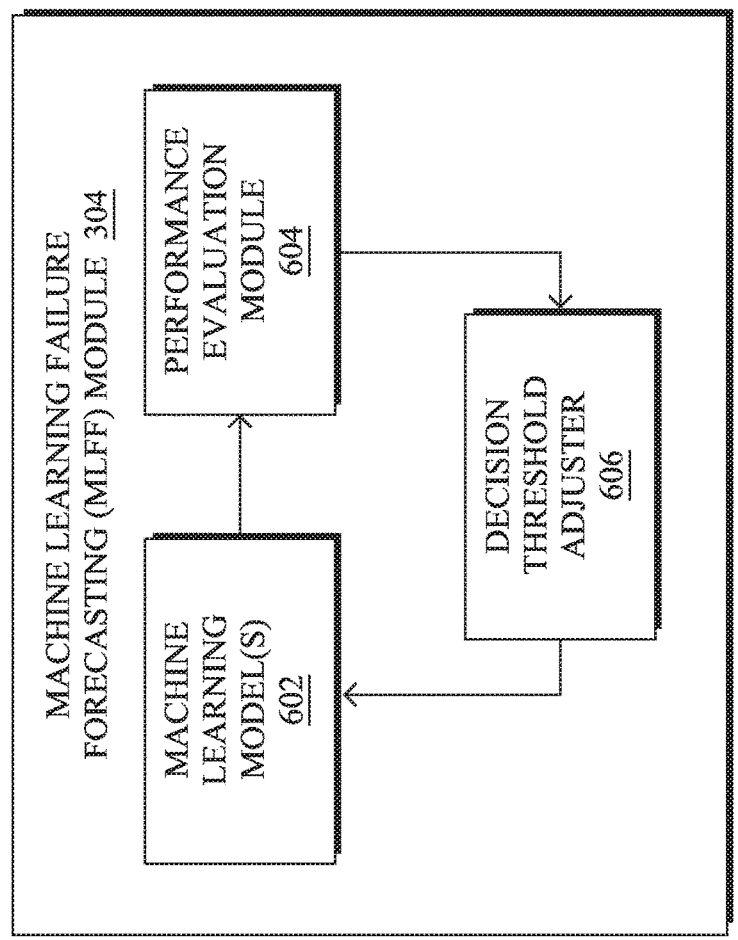
FIG. 6 illustrates an example architecture for adaptive decision threshold selection for SD-WAN tunnel failure prediction.

Operationally, FIG. 6 illustrates an example architecture 600 for adaptive decision threshold selection for SD-WAN tunnel failure prediction, in accordance with the embodiments herein. As shown, MLFF module 304, described previously with respect to FIG. 3, may include any number of machine learning models 602 configured to predict tunnel failures in the SD-WAN, based on captured telemetry data from the SD-WAN. In various embodiments, model(s) 602 may include one or more machine learning-based classifiers configured to output probabilistic predictions for its class labels. For example, the classifier may assign probabilities to a positive class (e.g., tunnel failure) and to a negative class (e.g., normal tunnel operation). In turn, in various embodiments, the classifier may apply a decision threshold to the probabilistic outputs, to assign a final class label (e.g., whether the tunnel is predicted to fail or not).

In various embodiments, MLFF module 304 may also include a performance evaluation module 604 configured to evaluate the performance of machine learning model(s) 602 over time and potentially on a per-tunnel basis. To do so, performance evaluation module 604 may quantify the performance of the model(s) 602 using a maximum forecastable failure prediction metric.

To better understand the maximum forecastable failure prediction metric, let $x_t$ denote the feature vector (e.g., set of telemetry measurements) that represents the state of the network at time t. Also, let $L_t$ represent the label generated based on $x_t$. For example, $L_t$ may be zero, if no event occurs, and one, if the event occurs. In the particular context of the teachings herein, such an event may correspond to a failure of a tunnel in the SD-WAN under scrutiny. As mentioned earlier, such failures occur quite rarely, on average, thus causing $L_t$ to be nearly always zero. The notion of rareness should be taken with a grain of salt: the objective is to forecast failures that, in general, occur pretty often from a network serviceability perspective but quite rarely when compared to the number of occurrences of tunnel being up, also referred to as negative samples.

A forecasting/prediction model of machine learning model(s) 602 can be generated by training a classifier C to predict $L_{t+1}$, given a feature vector $X_t = [x_{t-N}, x_{t-(N-1)}, x_t]$ where N is an arbitrary parameter that represents the lookback period. Now, because $L_t$ is nearly always zero, the dataset is highly imbalanced. Importantly, an SD-WAN is made up of a large number of tunnels, each of them producing a separate stream of telemetry data. Therefore, as many feature vectors $X_{t,i}$ as there are tunnels $T_i$ can be constructed and used to perform inferences using classifier C in model(s) 602 trained on data from all tunnels. Of course, the set of tunnels selected for purposes of training the classifier can vary, as desired.

According to various embodiments, performance evaluation module 604 may aggregate data from any or all tunnels $T_i$ in the network, build a feature vector $X_{t,i}$, and update a precision-recall curve for $T_i$. The precision-recall curve is a way to evaluate the precision-recall tradeoff of the classifier C governed by its decision threshold. At every timestamp t, performance evaluation module 604 may perform an inference step of the classifier C model(s) 602 and compare the actual label $L_t$ with the predicted label $L^\sim_t$ for different values of the decision threshold of the classifier. Said differently, a key function of performance evaluation module 604 is verify, using a lookback period, whether a tunnel failure predicted by the classifier using one of the decision thresholds actually occurred. In turn, performance evaluation module 604 may use the identified true positives, false positives, true negatives, and/or false negatives by the classifier, to generate the precision recall curve for the classifier and for different decision threshold values.

In various embodiments, decision threshold adjuster 606 of MLFF module 304 may take as input the mapping of threshold values and label comparisons produced by performance evaluation module 604 (e.g., the precision recall curve information) and dynamically sets the decision threshold of the classifier in machine learning model(s) 602, to optimize its precision-recall tradeoff. More formally, decision threshold adjuster 606 may dynamically adapt the decision threshold $D_{C,i}$ of classifier C in model(s) 602 for tunnel $T_i$, based on its performance metrics computed by performance evaluation module 604.

Decision threshold adjuster 606 may employ a number of different strategies, to optimize the precision-recall tradeoff of the prediction model(s) 602. In the simplest embodiment, performance evaluation module 604 may aggregate the mappings between decision thresholds and model performance to build a complete precision-recall curve. In turn, decision threshold adjuster 606 may set the decision threshold at a value that optimizes the precision-recall curve for that tunnel. To do so, decision threshold adjuster 606 may first set a minimum acceptable precision such that the precision $>P_{Min}$ (usually close to 1, i.e., 100% precision) and then identify the decision threshold that gives the maximum recall that satisfies the precision constraint.

In a further embodiment, performance evaluation module 604 and decision threshold adjuster 606 may function iteratively, to adjust the decision threshold of the model 602 at every timestamp t, based on the value $D_{switch}$ of the decision threshold that causes the classifier to switch from a correct to an incorrect prediction. Pseudocode for such an approach is as follows:

```
if L_t = 0 (no event) then
    if D_{C,i} < D_{switch} (current threshold is correct) then
        Set alpha to 0.01
    endif
    if D_{C,i} > D_{switch} (current threshold causes false positive) then
        Set alpha to 1.0
    endif
endif
if L_t = 1 (event) then
    if D_{C,i} < D_{switch} (current threshold causes false negative) then
        Set alpha to 0.9
    endif
    if D_{C,i} > D_{switch} (current threshold is correct) then
        Set alpha to 0.0
    endif
endif
Set D_{C,i} to (1.0-alpha)*D_{C,i} + alpha * D_{switch}
```

In a nutshell, the above approach pushes quickly the decision threshold of the classifier towards the value $D_{switch}$ when it makes mistakes, and very slowly when its predictions are correct. As a result, the classifier will slowly increases its threshold $D_{C,i}$ for a given tunnel $T_i$ that is always correctly predicted, thus increasing the recall, whereas it will immediately set the threshold to a conservative value whenever a false positive is generated.

A working prototype of the techniques herein was constructed. An example trace produced by the prototype follows, with true positive (TP), false positive (FP), and false negative (FN) predictions noted:

Run adaptive thresholding with initial threshold: 0.99
2018-08-21 23:36:00 (2936): TP prediction 0.9977393911098749 with both adaptive threshold 0.99 and static threshold 0.99
2018-08-30 19:20:00 (15546): TP prediction 0.9954223088719119 with both adaptive threshold 0.99 and static threshold 0.99
2018-08-30 19:35:00 (15547): TP prediction 0.9991964055149739 with both adaptive threshold 0.99 and static threshold 0.99
2018-08-30 19:46:00 (15548): TP prediction 0.9965578548949756 with both adaptive threshold 0.99 and static threshold 0.99
2018-08-30 19:46:00 (15548): Found better threshold, adapt the threshold from 0.99 0.9857426916321964
2018-08-30 20:02:00 (15549): TP prediction 0.9999614304459975 with both adaptive threshold 0.9857426916321964 and static threshold 0.99
2018-08-30 20:02:00 (1.5549): Found better threshold, adapt the threshold from 0.9857426916321964 to 0.9846783645402455
2018-08-30 20:06:00 (15550): TP prediction 0.9998490766949302 with both adaptive threshold 0.9846783645402455 and static threshold 0.99
2018-08-30 20:06:00 (15550): Found better threshold, adapt the threshold from 0.9846783645402455 to 0.9844122827672578
2018-08-30 20:20:00 (15552): TP prediction (19913483216878067 with both adaptive threshold 0.98441228:27672578 and static threshold 0.99
2018-08-30 20:20:00 (1.5552): Found better threshold, adapt the threshold from 0.9844122827672578 to 0.9843457623240108
2018-08-30 20:27:00 (15553): TP prediction 0.999101198294657 with both adaptive threshold 0.98434576232401.08 and static threshold 0.99
2018-08-30 20:27:00 (15553): Found better threshold, adapt the threshold from 0.9843457623240108 to 0.984329132:2131992
2018-08-30 20:32:00 (15554): FP prediction 0.9888445611392672 with adaptive threshold 0.9843291322131992 (avoided with static threshold 0.99)
2018-08-30 20:32:00 (15554): Mistake: adapt the threshold from 0.9843291322131992 to 0.9913483216878067
2018-08-30 20:50:00 (15563): TP prediction 0.9934801442808187 with both adaptive threshold 0.9913483216878067 and static threshold 0.99
2018-08-30 20:58:00 (15565): FP prediction 0.9980505467604216 with adaptive threshold 0.9913483216878067 and with static threshold 0.99
2018-08-30 20:58:00 (15565): Mistake: adapt the threshold from 0.9913483216878067 to 0.999101198294657
2018-09-03 18:04:00 (21072): FN prediction 0.9918670519736524 is not discovered with adaptive threshold 0.999101198294657, but is discovered (TP) with static threshold 0.99
2018-09-07 16:08:00 (26598): TP prediction 0.9994467871843686 with both adaptive threshold 0.999101198294657 and static threshold 0.99
2018-09-12 19:15:00 (33864): FN prediction (199289435111305 is not discovered with adaptive threshold 0.999101198294657 but is discovered (TP) with static threshold (199
2018-09-27 17:55:00 (54991): FN prediction 0.9918918477009189 is not discovered with adaptive threshold 0.999101198294657, but is discovered (TP) with static threshold 0.99

In the example above, the adaptive thresholding was able to capture 10 TPs with only 2 FIN, whereas a static threshold of 0.99 (initial setting) would have achieved capture only three more TPs, but at the cost of 15 FPs. In the case of predicting SD-tunnel failures, false positives are very costly, as they will cause tunnels to be rerouted, unnecessarily. Very similar results are achieved using different values of the static threshold or different scenarios.

In various embodiments, another aspect of the techniques herein allows tunnels to locally advertise the performance of their predictive routing mechanisms as SLA characteristics. For example, a tunnel can advertise the Maximum Forecastable Failure Prediction (MFFP) computed by of its associated failure prediction model/classifier, along with other traditional SLA characteristics such as delay, loss, and jitter, as measured using BFD probes. In this case, the MFFP metric represents that maximum recall computed for the tunnel. Said differently, the maximum recall represents the maximum percentage of failures that can be forecasted with high precision, where high precision is at least equal to a given value. The MFFP may be expressed as (R, P) where R is the maximum recall for precision $P > P_{Min}$. For example, if MFFP=(0.3, 0.9) this means that the classifier for the tunnel is capable of forecasting 30% of tunnel failures with at least 90% precision.

The MFFP becomes a key SLA characteristic for the tunnel that can be used for per-application tunnel selection in the SD-WAN. Indeed, many applications are very sensitive to packet loss, especially in the absence of recovery mechanisms at lower layers. In such a case, the SD-WAN may be required to select a tunnel for an application that offers a high MFFP and benefits from high predictable forecastable rates. In a simple embodiment, the new SLA characteristic (e.g., MFFP or other model performance metric) may be added to the per-application SLA requirement, for the tunnel to be eligible to convey the application traffic, and expressed as a minimum SLA to meet (e.g., the tunnel must provide a minimum MFFP=X to be eligible for application A). In another embodiment, the MFFP may take precedence over other SLA characteristics, such as delay, loss, jitter, etc. (e.g., select tunnel with highest MFFP). For example, so long as the tunnel satisfies the SLA constraints delay <D2, loss <L2, and/or jitter <J2, where D2, J2, L2 have different values than the default value for the application SLA, the tunnel may be selected to convey the application traffic, in absence of the MFFP tunnel SLA characteristic being explicitly stated. Note also that the tunnel MFFP and/or other performance measures of its associated failure prediction model is dynamic and will be updated as new classifiers are (re-)trained, thus leading to potential updates of per-tunnel application routing decisions, as well.

Figure 7:
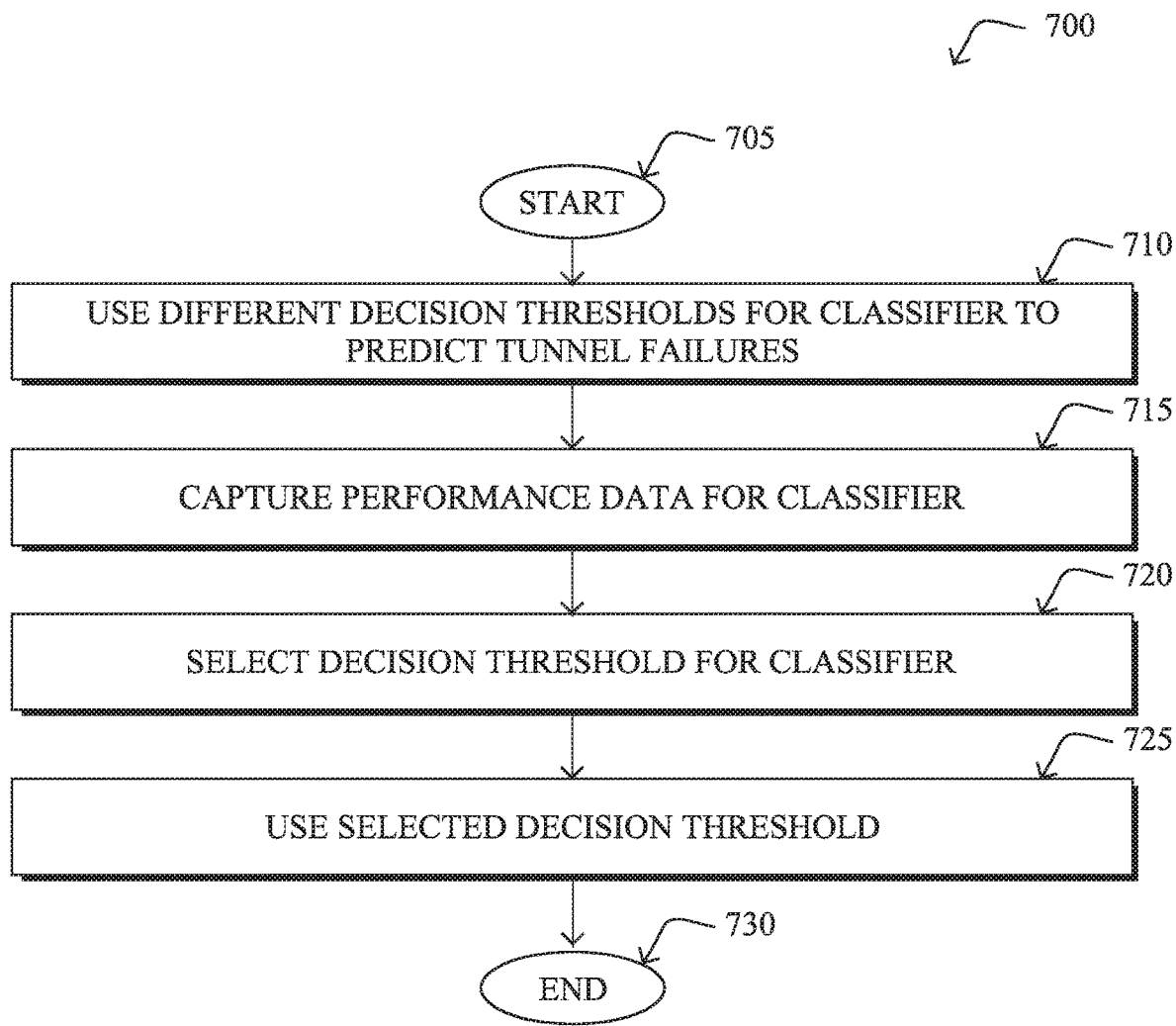
FIG. 7 illustrates an example simplified procedure for selecting a decision threshold for SD-WAN tunnel failure prediction.

FIG. 7 illustrates an example simplified procedure for selecting a decision threshold for SD-WAN tunnel failure prediction, in accordance with one or more embodiments described herein. For example, a non-generic, specifically configured device (e.g., device 200) may perform procedure 700 by executing stored instructions (e.g., process 248), to provide a supervisory service to one or more SD-WANs. The procedure 700 may start at step 705, and continues to step 710, where, as described in greater detail above, the supervisory service may use a plurality of different decision thresholds for a machine learning-based classifier, to predict tunnel failures of a tunnel in the SD-WAN. For example, the decision threshold may specify a minimum for the probability of a label assigned by the classifier (e.g., a tunnel failure label), for the classifier to predict that a tunnel failure will actually occur.

At step 715, as detailed above, the supervisory service may capture performance data indicative of performance of the classifier when using the different decision thresholds. For example, the service may employ a lookback period, to verify whether a tunnel failure predicted by the classifier using one of the decision thresholds actually occurred. In turn, the service may compute the recall and/or precision of the classifier that predicted the tunnel failure. From this information, the service may compute a precision-recall curve for the classifier, in some cases. In further embodiments, the service may instead iteratively test different decision threshold and assess whether a threshold change causes the classifier to start making incorrect predictions.

At step 720, the service may select, based on the captured performance data, a particular decision threshold for the classifier, in an attempt to optimize the performance of the classifier, as described in greater detail above. For example, if the service computes a precision-recall curve for the classifier, it may set a minimum acceptable precision on the precision-recall curve, and select a decision threshold that maximizes recall on the precision-recall curve while satisfying the minimum acceptable precision. In further embodiments, the service may switch a current decision threshold of the classifier to another one of the decision thresholds, based in part on whether the current decision threshold caused the classifier to switch from making correct tunnel failure predictions to an incorrect tunnel failure prediction.

At step 725, as detailed above, the service may use the selected decision threshold for the classifier, to predict a tunnel failure of the tunnel. In some embodiments, in advance of the predicted failure actually occurring, the service may reroute the tunnel to avoid the predicted failure. In further embodiments, the service may cause the tunnel to advertise a maximum recall associated with the selected decision threshold for the classifier as a SLA characteristic of the tunnel. This allows applications in the SD-WAN to use tunnels having at least a threshold failure prediction performance, depending on the needs of the application. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the dynamic adjustment of the decision threshold of a classifier trained to predict SD-WAN tunnel failures. In doing so, the performance of the classifier can be optimized, potentially on a per-tunnel basis, even when the classifier is trained using training data from any number of tunnels. In further aspects, the tunnels can also advertise the performance of their failure prediction classifiers as an additional SLA, allowing applications to be assigned to tunnels, accordingly.

While there have been shown and described illustrative embodiments that provide for dynamically adjusting decision thresholds for SD-WAN failure prediction, it is to be understood that various other adaptations and modifications may be made within the spirit and scope of the embodiments herein. For example, while certain embodiments are described herein with respect to using certain models for purposes of predicting tunnel failures, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
using, by a supervisory service for a software-defined wide area network (SD-WAN), a plurality of different decision thresholds for a machine learning-based classifier, to predict tunnel failures of a tunnel in the SD-WAN;
capturing, by the supervisory service, performance data indicative of performance of the machine learning-based classifier when using the different decision thresholds;
computing, by the supervisory service, a precision-recall curve for the machine learning-based classifier, wherein the precision-recall curve is computed according to precision and recall metrics for the machine learning-based classifier across the different decision thresholds, wherein the precision and recall metrics for the machine learning-based classifier comprise one or more of: a precision of the machine learning-based classifier and a recall of the machine learning-based classifier;
selecting, by the supervisory service and based on the captured performance data, a particular decision threshold among the different decision thresholds for the machine learning-based classifier using the precision-recall curve that is computed, in an attempt to optimize the performance of the machine learning-based classifier; and
using, by the supervisory service, the selected decision threshold for the machine learning-based classifier, to predict a tunnel failure of the tunnel.

2. The method as in claim 1, wherein capturing the performance data indicative of the performance of the machine learning-based classifier when using the different decision thresholds comprises:
employing a lookback period to verify whether a tunnel failure predicted by the machine learning-based classifier using one of the decision thresholds actually occurred.

3. The method as in claim 1, wherein the captured performance data comprises the precision and recall metrics for the machine learning-based classifier.

4. The method as in claim 3, wherein selecting the particular decision threshold for the machine learning-based classifier, in an attempt to optimize the performance of the machine learning-based classifier comprises:
setting a minimum acceptable precision on the precision-recall curve, wherein the particular decision threshold that is selected maximizes recall on the precision-recall curve while satisfying the minimum acceptable precision.

5. The method as in claim 1, further comprising:
causing, by the supervisory service, the tunnel to advertise a maximum recall associated with the selected decision threshold for the machine learning-based classifier as a service level agreement (SLA) characteristic of the tunnel.

6. The method as in claim 1, wherein using the plurality of different decision thresholds of the machine learning-based classifier, to predict tunnel failures of the tunnel in the SD-WAN, comprises:
switching a current decision threshold of the machine learning-based classifier to another one of the decision thresholds, based in part on whether the current decision threshold caused the machine learning-based classifier to switch from making correct tunnel failure predictions to an incorrect tunnel failure prediction.

7. The method as in claim 1, wherein a decision threshold of the machine learning-based classifier defines a threshold probability associated with a prediction made by the machine learning-based classifier that must be met for the prediction to be considered a tunnel failure prediction.

8. The method as in claim 1, further comprising:
training, by the supervisory service, the machine learning-based classifier using a training dataset comprising telemetry data for a plurality of tunnels in the SD-WAN.

9. The method as in claim 1, further comprising:
proactively rerouting the tunnel in the SD-WAN, based on the tunnel failure predicted by the machine learning-based classifier using the selected decision threshold.

10. An apparatus, comprising:
one or more network interfaces to communicate with one or more software-defined wide area networks (SD-WANs);
a processor coupled to the network interfaces and configured to execute one or more processes; and
a memory configured to store a process executable by the processor, the process when executed configured to:
use a plurality of different decision thresholds for a machine learning-based classifier, to predict tunnel failures of a tunnel in the SD-WAN;
capture performance data indicative of performance of the machine learning-based classifier when using the different decision thresholds;
compute a precision-recall curve for the machine learning-based classifier, wherein the precision-recall curve is computed according to precision and recall metrics for the machine learning-based classifier across the different decision thresholds, wherein the precision and recall metrics for the machine learning-based classifier comprise one or more of: a precision of the machine learning-based classifier and a recall of the machine learning-based classifier;
select, based on the captured performance data, a particular decision threshold among the different decision thresholds for the machine learning-based classifier using the precision-recall curve that is computed, in an attempt to optimize the performance of the machine learning-based classifier; and
use the selected decision threshold for the machine learning-based classifier, to predict a tunnel failure of the tunnel.

11. The apparatus as in claim 10, wherein the apparatus captures the performance data indicative of the performance of the machine learning-based classifier when using the different decision thresholds by:
employing a lookback period to verify whether a tunnel failure predicted by the machine learning-based classifier using one of the decision thresholds actually occurred.

12. The apparatus as in claim 10, wherein the captured performance data comprises the precision and recall metrics for the machine learning-based classifier.

13. The apparatus as in claim 12, wherein the apparatus selects the particular decision threshold for the machine learning-based classifier, in an attempt to optimize the performance of the machine learning-based classifier by:
 setting a minimum acceptable precision on the precision-recall curve, wherein the particular decision threshold that is selected maximizes recall on the precision-recall curve while satisfying the minimum acceptable precision.

14. The apparatus as in claim 10, wherein the process when executed is further configured to:
 cause the tunnel to advertise a maximum recall associated with the selected decision threshold for the machine learning-based classifier as a service level agreement (SLA) characteristic of the tunnel.

15. The apparatus as in claim 10, wherein the apparatus uses the plurality of different decision thresholds of the machine learning-based classifier, to predict tunnel failures of the tunnel in the SD-WAN, by:
 switching a current decision threshold of the machine learning-based classifier to another one of the decision thresholds, based in part on whether the current decision threshold caused the machine learning-based classifier to switch from making correct tunnel failure predictions to an incorrect tunnel failure prediction.

16. The apparatus as in claim 10, wherein a decision threshold of the machine learning-based classifier defines a threshold probability associated with a prediction made by the machine learning-based classifier that must be met for the prediction to be considered a tunnel failure prediction.

17. The apparatus as in claim 10, wherein the process when executed is further configured to:
 train the machine learning-based classifier using a training dataset comprising telemetry data for a plurality of tunnels in the SD-WAN.

18. The apparatus as in claim 10, wherein the process when executed is further configured to:
 proactively reroute the tunnel in the SD-WAN, based on the tunnel failure predicted by the machine learning-based classifier using the selected decision threshold.

19. A tangible, non-transitory, computer-readable medium storing program instructions that cause a supervisory service for a software-defined wide area network (SD-WAN) to execute a process comprising:
 using, by the supervisory service for the SD-WAN, a plurality of different decision thresholds for a machine learning-based classifier, to predict tunnel failures of a tunnel in the SD-WAN;
 capturing, by the supervisory service, performance data indicative of performance of the machine learning-based classifier when using the different decision thresholds;
 computing, by the supervisory service, a precision-recall curve for the machine learning-based classifier, wherein the precision-recall curve is computed according to precision and recall metrics for the machine learning-based classifier across the different decision thresholds, wherein the precision and recall metrics for the machine learning-based classifier comprise one or more of: a precision of the machine learning-based classifier and a recall of the machine learning-based classifier;
 selecting, by the supervisory service and based on the captured performance data, a particular decision threshold among the different decision thresholds for the machine learning-based classifier using the precision-recall curve that is computed, in an attempt to optimize the performance of the machine learning-based classifier; and
 using, by the supervisory service, the selected decision threshold for the machine learning-based classifier, to predict a tunnel failure of the tunnel.

20. The tangible, non-transitory, computer-readable medium as in claim 19, further comprising:
 causing, by the supervisory service, the tunnel to advertise a maximum recall associated with the selected decision threshold for the machine learning-based classifier as a service level agreement (SLA) characteristic of the tunnel.

* * * * *

UNITED STATES PATENT AND TRADEMARK OFFICE
CERTIFICATE OF CORRECTION

PATENT NO.        : 11,574,241 B2
APPLICATION NO.   : 16/392825
DATED             : February 7, 2023
INVENTOR(S)       : Sharon Shoshana Wulff et al.

It is certified that error appears in the above-identified patent and that said Letters Patent is hereby corrected as shown below:

In the Specification

In Column 12, Line 58, please amend as shown:
assign the sample to class/label 1 as the probability of the In Column 13, Line 14, please amend as shown:
application SLAs may be defined, to control which tunnels In Column 14, Line 57, please amend as shown:
ence step of the classifier C in model(s) 602 and compare the In Column 16, Line 8, please amend as shown:
adapt the threshold from 0.99 to 0.9857426916321964

Signed and Sealed this
Eleventh Day of April, 2023

Katherine Kelly Vidal
*Director of the United States Patent and Trademark Office*